(12) United States Patent
Subramanian et al.

(10) Patent No.: US 11,977,908 B2
(45) Date of Patent: May 7, 2024

(54) STREAMLINING THE EXECUTION OF SOFTWARE SUCH AS RADIO ACCESS NETWORK DISTRIBUTED UNITS

(71) Applicant: DISH Wireless L.L.C., Englewood, CO (US)

(72) Inventors: Prakash Subramanian, Littleton, CO (US); Michael Scott Tarver, Allen, TX (US); Jason Marcus Sachinger, Cheyenne, WY (US)

(73) Assignee: DISH Wireless L.L.C., Englewood, CO (US)

( * ) Notice: Subject to any disclaimer, the term of this patent is extended or adjusted under 35 U.S.C. 154(b) by 441 days.

(21) Appl. No.: 17/371,619

(22) Filed: Jul. 9, 2021

(65) Prior Publication Data
US 2023/0008274 A1 Jan. 12, 2023

(51) Int. Cl.
*G06F 9/455* (2018.01)

(52) U.S. Cl.
CPC ............ *G06F 9/45558* (2013.01); *G06F 2009/45583* (2013.01); *G06F 2009/45595* (2013.01)

(58) Field of Classification Search
CPC ....... G06F 9/45558; G06F 2009/45587; G06F 2009/45583; G06F 2009/45595
See application file for complete search history.

(56) References Cited

U.S. PATENT DOCUMENTS

| | | | |
|---|---|---|---|
| 2005/0132364 A1* | 6/2005 | Tewari | G06F 9/45558 718/1 |
| 2005/0138620 A1* | 6/2005 | Lewites | G06F 9/45537 718/1 |
| 2006/0015584 A1* | 1/2006 | Ocko | H04L 69/40 709/219 |
| 2006/0123056 A1* | 6/2006 | Darbha | H04N 21/443 |
| 2008/0127348 A1* | 5/2008 | Largman | G06F 9/45558 726/24 |
| 2013/0097464 A1* | 4/2013 | Ahmad | G06F 11/0751 714/E11.144 |
| 2013/0272290 A1* | 10/2013 | Liu | H04W 12/069 370/338 |
| 2013/0332927 A1* | 12/2013 | Tang | G06F 9/45545 718/1 |
| 2014/0137104 A1* | 5/2014 | Nelson | G06F 9/45558 718/1 |
| 2015/0207956 A1* | 7/2015 | Fukushima | H04N 1/21 358/1.16 |
| 2016/0127447 A1* | 5/2016 | Jiang | G06F 9/452 709/203 |
| 2016/0162302 A1* | 6/2016 | Warszawski | G06F 9/45558 713/2 |

(Continued)

*Primary Examiner* — Tuan C Dao
(74) *Attorney, Agent, or Firm* — Kipman Tyler Werking; VLP Law Group LLP

(57) ABSTRACT

A facility for operating an application on a server having a number of processors is described. The facility receives a number of application requests, each addressed to one of a plurality of instances of the application executing on the server. The facility causes each received application request to be processed in the application instance to which it was addressed, using exclusively processing resources of a selected one of the plurality of processors on which the application instance was invoked, using exclusively memory locations served by memory modules to which the selected processor is directly connected.

16 Claims, 3 Drawing Sheets

(56) References Cited

U.S. PATENT DOCUMENTS

2016/0357780 A1* 12/2016 March ................ G06F 9/45558
2016/0373356 A1* 12/2016 Xu .......................... H04L 45/66
2020/0326980 A1* 10/2020 Prantner ............... G06F 9/5038
2022/0111387 A1*  4/2022 Paolini, Jr. ........ B01L 3/502792

* cited by examiner

STREAMLINING THE EXECUTION OF SOFTWARE SUCH AS RADIO ACCESS NETWORK DISTRIBUTED UNITS

BACKGROUND

Many kinds of request-processing applications depend on processing large volumes of requests at low latency with a high certainty of execution. One such application is the distributed unit ("DU") component of the 5G radio access network architecture that interacts directly with a wireless base station's radios.

A typical hardware choice for executing such applications is a rack server in which are installed two or more server-grade, multicore processors. These servers are operated in a pooled mode, in which tasks received by the server are balanced across all of the processors and the hardware resources connected to them, such as volatile memory, persistent storage, and network ports. Each processor and its associated hardware resources are said to be contained in a non-uniform memory access ("NUMA") boundary of the server.

This approach provides resources to handle an undifferentiated processing load that is beyond the capacity of a single processor or its connected hardware resources, as well as good tolerance for the failure of a processor or its connected hardware resources.

DETAILED DESCRIPTION

Figure 1:
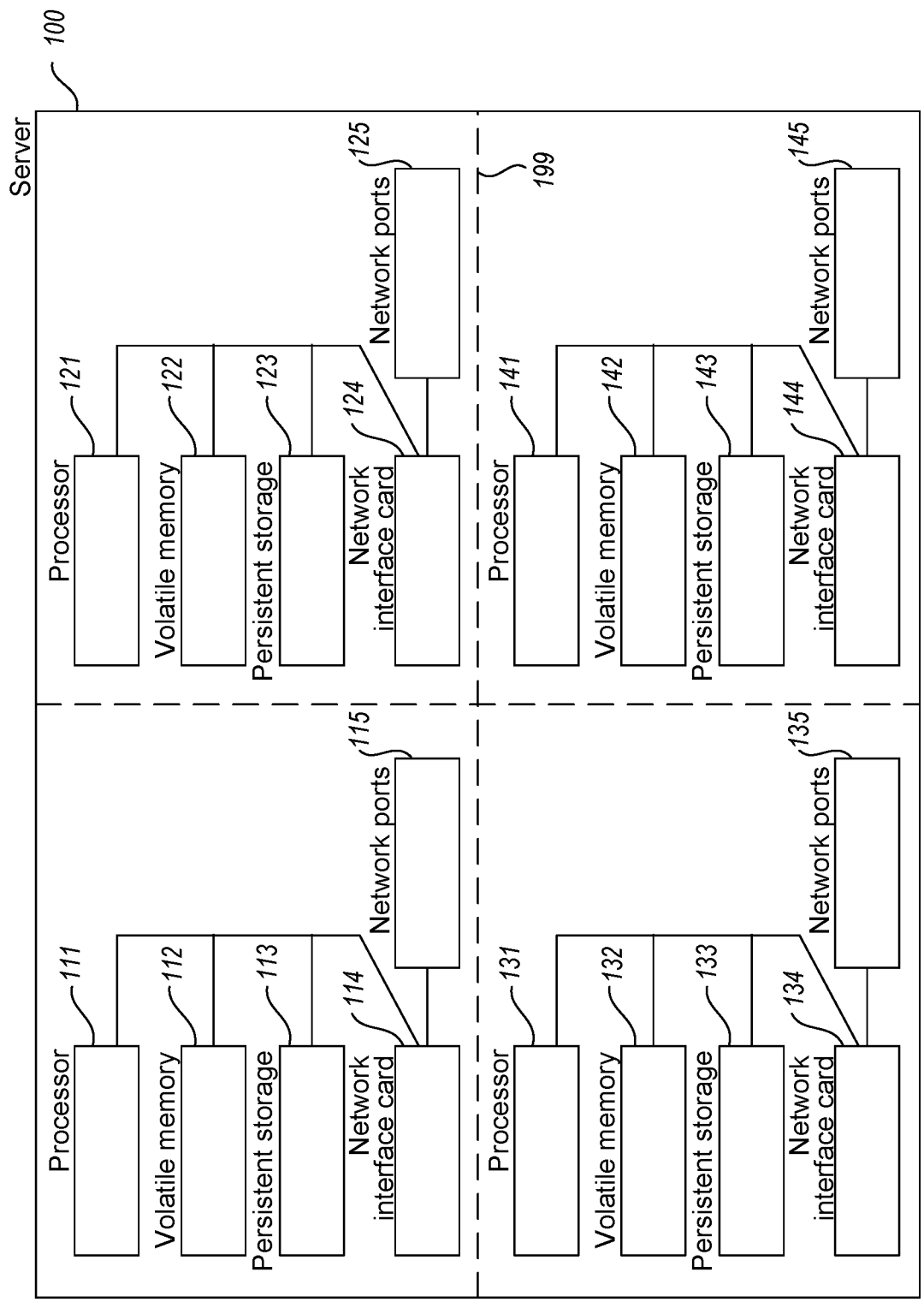
FIG. 1 is a block diagram showing hardware components of a typical server computer system in which the facility operates.

The inventors have recognized significant disadvantages of conventional approaches to managing the hardware implementation for demanding applications. In particular, they have realized that the operation of multiple-processor servers in pooled mode incurs latency penalties that result from requests crossing NUMA boundaries in the server. While the interconnects via which requests cross NUMA boundaries in the server operate at transmission speeds that are rapid relative to extra-motherboard networks, those speeds are still slow enough to meaningfully increase the processing latency of requests that cross NUMA boundaries; this boundary-crossing can also increase the processing latency of requests that are in process on a processor when a crossover request is received at the processor.

To overcome these disadvantages of conventional approaches to managing the hardware implementation for demanding applications, the inventors have conceived and reduced to practice a software and/or hardware facility for operating separate processors of multiple processor computer system in isolation ("the facility").

In a multiple-processor server, the facility establishes one virtual machine per processor to execute an instance of the application. The facility configures the virtual machine to execute exclusively on cores of the corresponding processor; limits the virtual machine's consumption of memory and storage resources to volumes that can be accommodated by the memory and storage that are directly connected to the corresponding processor; and maps the virtual network ports established in the virtual machine to physical network ports directly connected to a network interface card that is in turn directly connected to the corresponding processor. As a result, each instance of the application executes only the requests it receives from requestors, using its own connected hardware resources. No request crosses a NUMA boundary, or incurs the associated latency penalty.

The facility distributes application requests across the application instances. In some embodiments, the facility uses a load balancer node upstream in the network to perform this distribution. In some embodiments, the facility assigns different sources of requests to submit their requests to different application instances. For example, for a DU application that receives requests from different base station radios, the facility directs different base station radios to submit their DU requests to different DU application instances, at their corresponding network addresses.

By performing in some or all of the ways discussed above, the facility reduces the average latency of request processing, and in some cases improves throughput—the number of requests processed over a particular period of time.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, the facility increases the number of requests that can be processed in a particular period of time by a multiprocessor server, thus permitting a less powerful server to be substituted to handle the same number of requests in a period of time, or permitting the existing number of existing servers to be reduced, taken offline for maintenance, etc. Also, by reducing average request processing latency, the facility permits slower and cheaper networks to be used to achieve the same "after network" latency.

FIG. 1 is a block diagram showing hardware components of a typical server computer system in which the facility operates. In various embodiments, the facility operates on a variety of multi-processor servers. In some embodiments, the facility operates on a Dell PowerEdge R740 server line, some of which have DY2XO0 motherboards. In various embodiments, the server on which the facility operates have different numbers of processors, such as 2, 3, 4, 5, 6, 7, 8, 9, 10, 11, 12, 13, 14, 15, or 16.

The server 100 shown in FIG. 1 has 4 processors, 111, 121, 131, and 141. As noted above, in various embodiments, the facility operates on server having a various numbers of processors greater than 1. Processor 111 is directly connected to the following hardware resources within the server: RAM or other volatile memory 112 for storing programs and data while they are being used by the processor, including aspects of the facility and associated data, and operating system including a kernel and device drivers, and virtualization and/or packaging services; persistent storage 113, such as a hard drive or flash drive, for persistently storing programs and data; and a PCI Express or other network interface card 114 for connecting to other computer systems to send and/or receive data, such as via the Internet or another network and its networking hardware, such as switches, routers, repeaters, electrical cables and optical fibers, light emitters and receivers, radio transmitters and receivers, and the like. Network interface card 114 is in turn connected to network ports 115, by which Ethernet or other networking cables can be connected to the network interface card.

For each of the server's processors, the server contains a similar arrangement of directly-connected hardware resources: processor 121 is directly connected to volatile memory 122, persistent storage 123, and network interface card 124, which is in turn connected to network ports 125; processor 131 is directly connected to volatile memory 132, persistent storage 133, and network interface card 134, which is turn connected to network ports 135; and processor 141 is directly connected to volatile memory 142, persistent storage 143, and network interface card 144, which is connected to network ports 145. While the processors of the server are connected with one another via various interconnections, by operating in some or all the ways described herein, the facility isolates the processors from each other at NUMA boundaries 199. Hardware resources directly connected to one processor are similarly isolated from the other processors.

Figure 2:
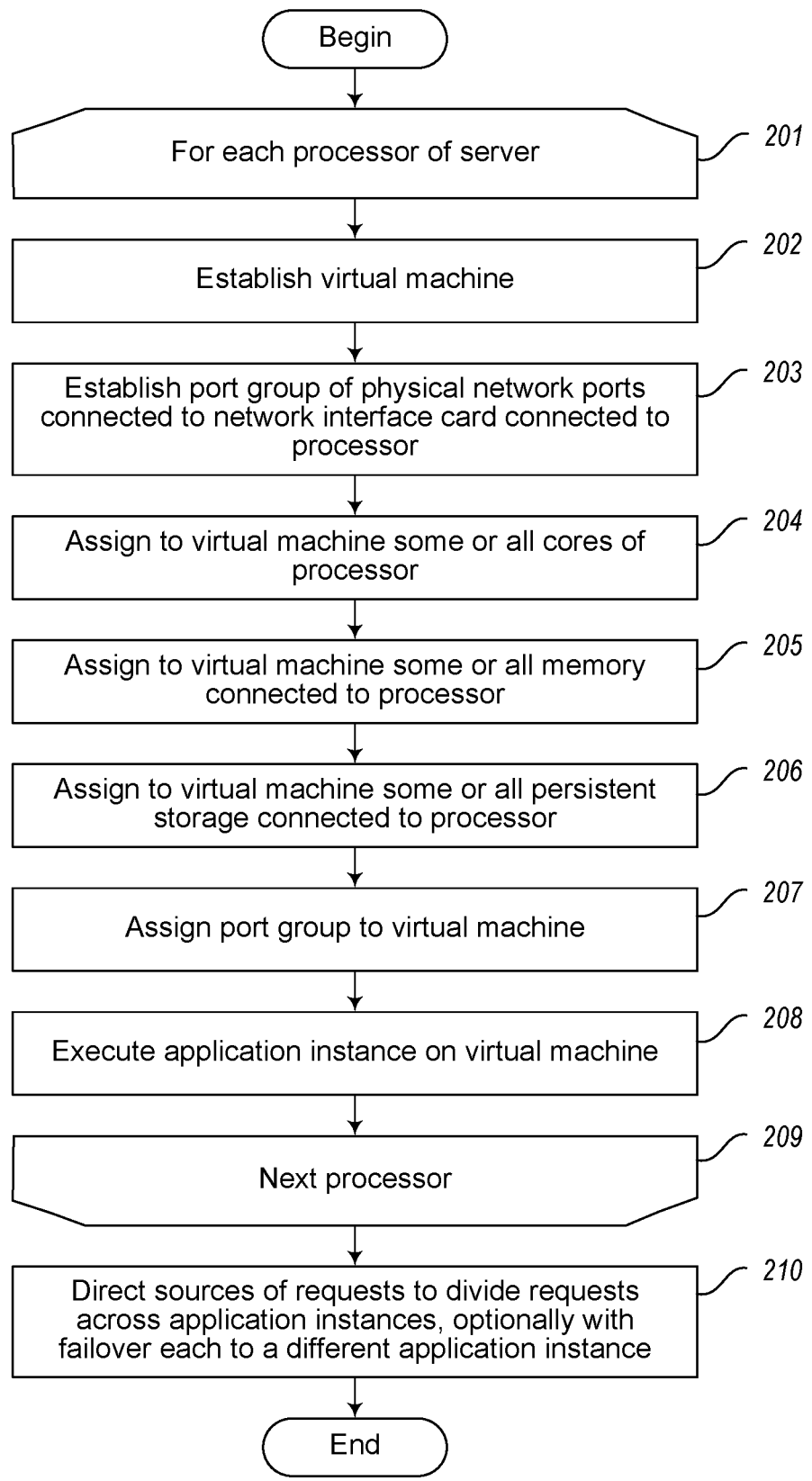
FIG. 2 is flow diagram showing a process performed by the facility in some embodiments.

FIG. 2 is flow diagram showing a process performed by the facility in some embodiments. In acts 201-209, the facility loops through each processor of the server. For example, in various embodiments, the facility loops through the two processors of a Dell PowerEdge R740 server, or the 4 processors of server 100 shown in FIG. 1. For a two processor server, in some embodiments, the facility selects the first processor, processor 0, for the first workload (virtual machine) to be assigned to and configured on the server. This processor selection is specified by the network orchestrator at the time of instantiation.

In act 202, the facility establishes a new virtual machine on the server. In some embodiments, the facility performs the virtual machine instantiation using a network orchestration function. This instantiation mechanism consumes a set of specifications, supplied through templates or configuration parameters, which are provided by the network orchestration function, as appropriate to underlying hypervisor and physical server.

In act 203, the facility establishes a port group that collects some or all of the physical network ports that are connected to the network interface card that is directly connected to a processor. For example, in the iteration of the loop performed by this facility for processor 111, the facility establishes a port group of physical network ports 115, which are connected to network interface card 114, which is connected directly to the processor. In some embodiments, the facility performs port group creation using a network orchestration function. This creation mechanism consumes a set of specifications, supplied through templates or configuration parameters, which are provided by the network orchestration function, as appropriate to underlying hypervisor and physical server. This port group creation establishes the linkage of a physical network port to the virtualized port group, and by extension, the network interface card which provides the physical port, as well as the processor that is connected to the network interface.

In act 204, the facility assigns to the virtual machine established in act 202 some or all of the cores of the processor for which the current iteration of the loop is being performed. In various embodiments, the facility performs this assignment specifically with respect to cores of the processor, or with respect to multiple threads that are executed by each of those cores. In some embodiments, the facility assigns fewer than all of the cores or threads provided by the processor, in order to provide computing resources for the virtual machine, its hypervisor, and/or other additional software needed or desired to run on the processor. In some embodiments, the facility performs the virtual machine vCPU creation and assignment using a network orchestration function. This creation and assignment mechanism consumes a set of specifications, supplied through templates or configuration parameters, which are provided by the network orchestration function, as appropriate to underlying hypervisor and physical server. In some embodiments, the facility specifies the linkage and assignment of a physical processor and core to a vCPU in a way and with limits that ensure that all vCPUs associated to the virtual machine will reside on a single physical processor in the server.

In act 205, the facility assigns to the virtual machine established in act 202 some or all of the memory that is directly connected to the processor. For example, for the iteration of the loop performed by the facility for processor 111, the facility assigns to the virtual machine some or all of memory 112. In some embodiments, the facility assigns less than all of this memory to the virtual machine to provide memory space for code and data of software such as the software identified above in connection with act 204 that is to run on the processor. In some embodiments, the facility performs the virtual machine memory assignment using a network orchestration function. This assignment mechanism consumes a set of specifications, supplied through templates or configuration parameters, which are provided by the network orchestration function, as appropriate to underlying hyper-visor and physical server. In some embodiments, the facility specifies the linkage and assignment of physical memory to be used by a virtual machine in a way and with limits that ensures all memory associated to the virtual machine will be that which is connected to a single physical processor in the target server.

In act 206, the facility assigns to the virtual machine some or all of the persistent storage that is directly connected to the processor. For example, in the iteration of the loop performed by the facility for processor 111, the facility assigns to the virtual machine some or all of persistent storage 113. In some embodiments, the facility assigns less than all of this persistent storage to the virtual machine in order to make persistent storage space available for code and data of other software that is to run on the processor, such as the software identified above in connection with act 204. In some embodiments, the facility performs the virtual machine storage assignment using a network orchestration function. This assignment mechanism consumes a set of specifications, supplied through templates or configuration parameters, which are provided by the network orchestration function, as appropriate to underlying hyper-visor and physical server. As storage is less affected by the delay penalty paid when data crosses the NUMA boundary, and for cost considerations, in some embodiments the facility connects all storage to the first processor, for sharing between all virtual machines served by the server.

In act 207, the facility assigns the port group established in act 203 to the virtual machine. In some embodiments, the facility performs the virtual machine port group assignment using a network orchestration function. This assignment mechanism consumes a set of specifications, supplied through templates or configuration parameters, which are provided by the network orchestration function, as appropriate to underlying hypervisor and physical server. The linkage established in step 203 may be further utilized to ensure that data flows associated with the virtual machine will utilize a single and specific processor, network interface card, and physical port.

In act 208, the facility launches an instance of the application, such as a DU instance, on the virtual machine. In some embodiments, the facility performs the virtual machine port group assignment using a network orchestration function. This assignment mechanism requires a set of specifications, supplied through templates or configuration parameters, which are provided by the network orchestration function, as appropriate to underlying hyper-visor and physical server. Each application instance is exclusively run within a virtual machine, and by extension can utilize resources directly associated to the virtual machine by the linkages described in 201 through 207.

In act 209, if additional processors remain to be processed, then the facility continues in act 201, else the facility continues in act 210. In some embodiments, the facility selects the next available processor on an underlying hyper-visor and physical server instance using the network orchestration function and utilizes it for a subsequent workload (virtual machine) that will be assigned to and configured on the server. In some embodiments, this processor selection is specified by the network orchestrator at the time of instantiation.

In act 210, the facility directs sources of requests, such as base unit radio systems, to divide their collective requests across the application instances executed in the different processors of the server. In some embodiments, the facility also directs a failover scheme, such that when one of the processors of the server fails or is otherwise disabled, requests that would have been directed to that processor are directed to a different processor of the server, or a sibling server.

As mentioned above, in various embodiments, the facility performs act 210 by interposing a load balancer between the sources of the requests and the server, or by identifying different ones of the application instances to different ones of the sources of requests. One responsibility of the network orchestrator is to maintain a accurate model of the network resources, such that adequate capacity is available in near real time. A virtual machine plus the application(s) running within it are constrained by the underlying physical resources, therefore to add capacity or fail-over in the event of a physical resource failure requires additional spare physical resources. Either of these conditions can be achieved using the network orchestration function, using steps 201 through 208. In some embodiments, the facility uses additional load-balancing techniques, such as external load balancers, and/or application-driven fail-over mechanisms such as active/active, active/standby, N+1 redundancy, etc.

After act 210, this process concludes.

Those skilled in the art will appreciate that the acts shown in FIG. 2 may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
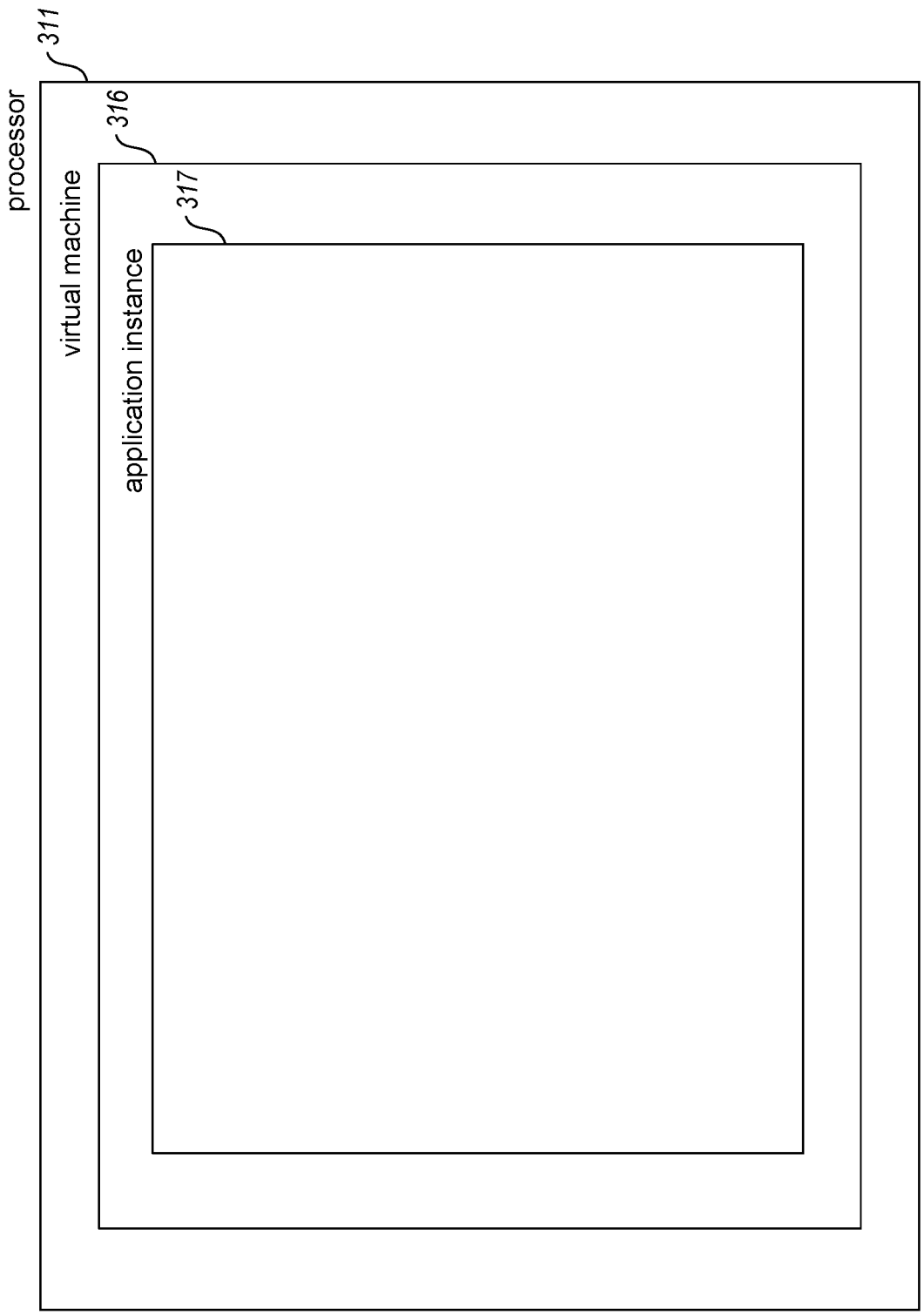
FIG. 3 is a block diagram showing the configuration of an application instance in a single one of the server's processors.

FIG. 3 is a block diagram showing the configuration of an application instance in a single one of the server's processors. In the diagram, processor 311 is executing a virtual machine 316 established in accordance with the process shown in FIG. 2. On the virtual machine is executing an application instance 317, launched in act 308 shown in FIG. 2. This application instance receives a share of the requests for the application, and services them using exclusively the processing resources of the processor, as well as the directly connected volatile memory, persistent storage, and network interface card and its network ports.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a server computer having a plurality of processors, a different block of memory being directly connected to each processor of the plurality, the method comprising:
   for each processor of the plurality:
      establishing a virtual machine that executes on the processor, to the exclusion of the other processors of the plurality;
      assigning to the virtual machine only memory within the block of memory that is directly connected to the processor; and
      invoking in the virtual machine an instance of a program configured to process requests received from outside the server computer;
   wherein:
   a different network interface card is directly connected to each processor of the plurality; and
   the method further comprises, for each processor of the plurality, before invoking the program instance, assigning to the virtual machine executing on the processor only the network interface card that is directly connected to the processor, such that all of the requests received and processed by the instance of the program executing in the virtual machine executed on the processor are received via the network interface card.

2. The method of claim 1 wherein, for each processor of the plurality, invoking an instance of a program comprises invoking an instance of a program implementing a distributed unit component of a radio access network architecture.

3. The method of claim 1 wherein, for each processor of the plurality, invoking an instance of a program comprises invoking an instance of a program implementing a centralized unit component of a radio access network architecture.

4. The method of claim 1 wherein, for each processor of the plurality, invoking an instance of a program comprises invoking an instance of a program configured to perform database access requests.

5. The method of claim 1 wherein a different set of network ports is directly connected to each processor of the plurality, the method further comprising:

for each processor of the plurality:
  before invoking the program instance:
    establishing a group of network ports containing only the network ports of the set directly connected to the processor; and
    assigning to the virtual machine executing on the processor only the network port group, such that all of the requests received and processed by the instance of the program executing in the virtual machine executed on the processor are received via the ports of the network port group.

6. The method of claim 1 wherein a different persistent storage device is directly connected to each processor of the plurality, the method further comprising:
  for each processor of the plurality:
    before invoking the program instance, assigning to the virtual machine executing on the processor only the persistent storage device that is directly connected to the processor, such that all persistent storage write operations performed by the program instance result in write operations against the persistent storage device that is directly connected to the processor.

7. One or more instances of non-transitory computer-readable media collectively having contents configured to cause a server having a plurality of processors to perform a method, the method comprising:
  receiving a plurality of radio access network distributed unit requests, each addressed to one of a plurality of instances of a program implementing a distributed unit component of a radio access network architecture; and
  for each received radio access network distributed unit request of the plurality:
    processing the radio access network distributed unit request in the program instance to which it was addressed, using exclusively processing resources of a selected one of the plurality of processors on which the program instance was invoked, and using exclusively memory locations served by memory modules to which the selected processor is directly connected;
  wherein for each received radio access network distributed unit request of the plurality, the processing uses exclusively processing resources of a selected one of the plurality of processors on which the program instance was invoke without traversing a virtualization layer.

8. The one or more instances of non-transitory computer-readable media of claim 7 wherein, for each received radio access network distributed unit request of the plurality, the processing uses exclusively processing resources of a selected one of the plurality of processors on which the program instance was invoked and exclusively memory locations served by memory modules to which the selected processor is directly connected via a virtual machine executing on the selected processor.

9. The one or more instances of non-transitory computer-readable media of claim 7 wherein each of the received radio access network distributed unit requests is received via a network card directly connected to the processor on which the program instance to which the received radio access network distributed unit request is addressed was invoked.

10. The one or more instances of non-transitory computer-readable media of claim 7 wherein each of the received radio access network distributed unit requests is received via a network port directly connected to the processor on which the program instance to which the received radio access network distributed unit request is addressed was invoked.

11. The one or more instances of non-transitory computer-readable media of claim 7 wherein, for each received radio access network distributed unit request of the plurality, the processing uses exclusively storage resources of a persistent storage device directly connected to the selected processor.

12. A server, comprising:
  a plurality of processors; and
  for each of the plurality of processors:
    a block of memory that is directly connected to the processor, the block of memory having contents that, when executed by the processor, cause the processor to:
      execute a virtual machine, to the exclusion of the other processors of the plurality, using exclusively memory in the block of memory that is directly connected to the processor, to the exclusion of memory that is directly connected to the other processors of the plurality; and
      execute in the virtual machine an instance of a program that receives a set of requests from outside the server and processes the received requests, such that distinct sets of requests are each received and processed in instances of the program executing in different virtual machines each using only the processing resources of a single processor and the block of memory directly connected to that processor;
  wherein
  a different network interface card is directly connected to each processor of the plurality; and
  for each of the plurality of processors, the contents further cause the processor to, before invoking the program instance, assign to the virtual machine executing on the processor only the network interface card that is directly connected to the processor, such that all of the requests received and processed by the instance of the program executing in the virtual machine executed on the processor are received via the network interface card.

13. The server of claim 12, further comprising:
  for each of the plurality of processors:
    a group of network ports that is directly connected to the processor, wherein all of the requests received and processed by the instance of the program executing in the virtual machine executed by the processor are received via the group of network ports.

14. The server of claim 12, further comprising:
  for each of the plurality of processors:
    a persistent storage device that is directly connected to the processor, wherein the virtual machine executed by the processor uses the persistent storage device to the exclusion of the virtual machines executed by the other processors of the plurality.

15. The server of claim 12 wherein the plurality of processors comprises two processors.

16. The server of claim 12 wherein the plurality of processors comprises four processors.

* * * * *